United States Patent Office 3,094,483
Patented June 18, 1963

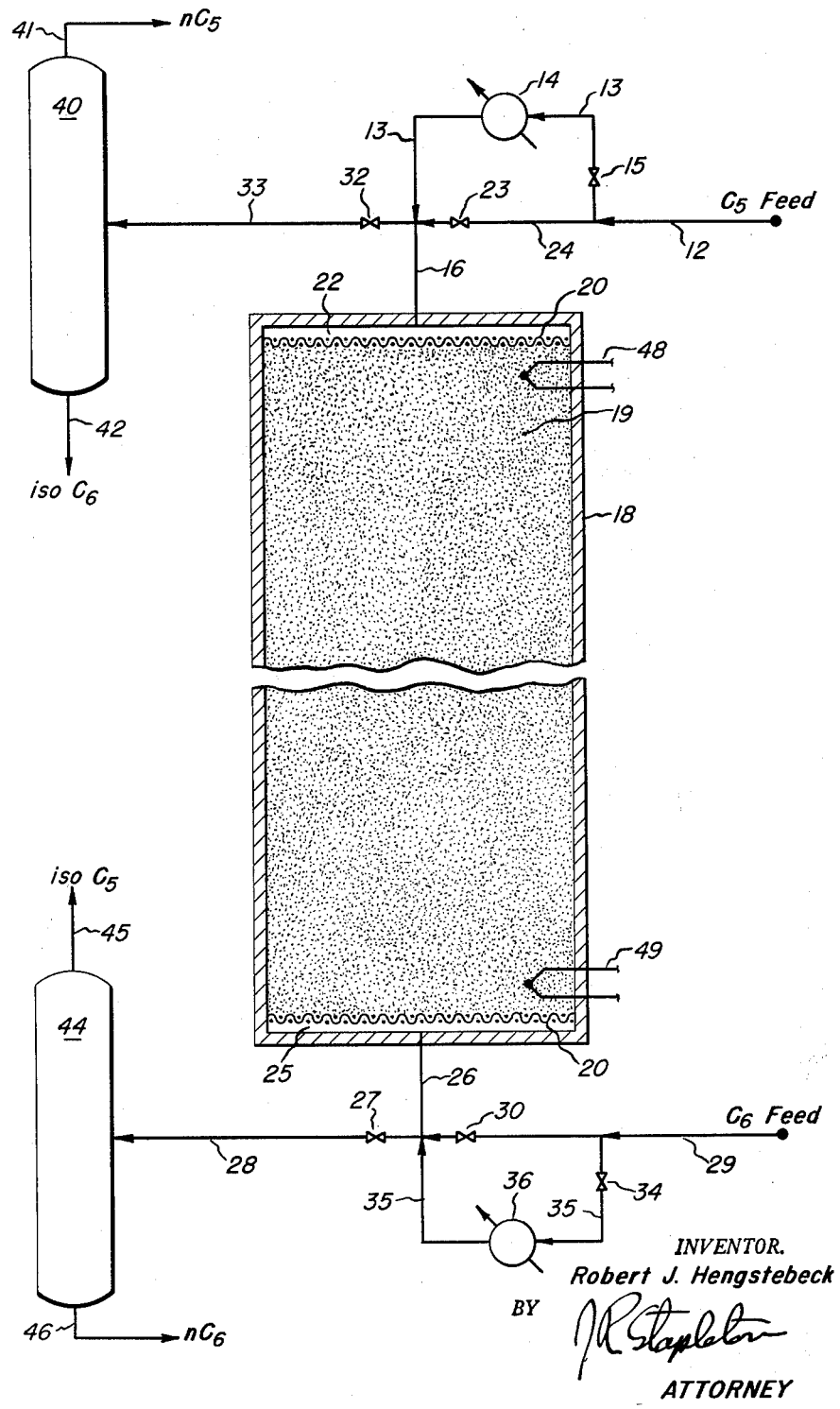

3,094,483
HYDROCARBON SEPARATION PROCESS
Robert J. Hengstebeck, Valparaiso, Ind., assignor to Standard Oil Company, Chicago, Ill., a corporation of Indiana
Filed July 12, 1960, Ser. No. 42,311
13 Claims. (Cl. 208—310)

This invention relates to the separation of hydrocarbons by differences in adsorption characteristics using zeolitic molecular sieves as the adsorbent. More particularly, this invention relates to an improvement in the desorption of molecular sieves. Zeolitic molecular sieves are useful as adsorbents for separating hydrocarbons by differences in adsorption characteristics. Generally, the molecular sieve makes use of pores in the molecular sieve material to effect separation. Accordingly, hydrocarbons are preferentially separated by molecular structure; the straight-chain hydrocarbons are capable of entering the pores of the molecular sieve and are adsorbed within the pores. The area within the pores is the major adsorption area of the sieve and this adsorption area is exposed solely to those hydrocarbons having molecular structure such that they are permitted to enter the pores.

In using molecular sieves for the separation of hydrocarbons, the molecular sieve is generally used in the form of a bed. A hydrocarbon feed containing hydrocarbons of differing adsorbabilities is passed through the bed of solid molecular sieve adsorbent and the more readily adsorbable hydrocarbon is adsorbed on the bed. The adsorbed hydrocarbon is then removed by some method of desorption. One such method of desorption is by displacement of the adsorbed hydrocarbon with another readily adsorbable hydrocarbon. Accordingly, after adsorption by passing a hydrocarbon feed through a bed, a second feed containing a readily adsorbable hydrocarbon is then charged to the bed and the readily adsorbable hydrocarbon of the second feed displaces the hydrocarbon previously adsorbed on the bed.

In accordance with the present invention, I have now provided a system wherein a temperature front or zone is passed through the molecular sieve bed immediately prior to displacement of the adsorbed hydrocarbons with the second feed containing readily adsorbable hydrocarbons.

Accordingly, the desorption by displacement step of normal adsorption-desorption cycle in using molecular sieves is effected by a combination of steps which comprises treating the adsorbent and adsorbed hydrocarbon on the adsorbent with an amount of hot fluid, e.g., a hot hydrocarbon material containing a second readily adsorbable hydrocarbon sufficient to provide a hot wave front across the bed and charging a cold second feed containing the second readily adsorbable hydrocarbon through the bed upstream from the wave front whereby the cold hydrocarbon pushes the wave front through the bed. The hot wave front is maintained at a temperature above the normal adsorption temperature of the molecular sieve. As the hot wave front is pushed through the bed by the cold hydrocarbon behind it, desorption occurs in front of the hot wave front and adsorption occurs behind it. The heat of the adsorption compensates for the heat of desorption.

In accordance with one embodiment of the invention, two feeds having different boiling ranges are alternatively charged through the adsorbent bed from opposite ends of the adsorbent bed. The hot wave front or hot wave zone is created in the bed after the first adsorption of the first feed by charging a hot fluid to the opposite end of the bed. The second feed is then charged to the same end of the bed as the hot fluid and the hot wave front is pushed through the bed toward the end at which the first feed was charged. When the hot wave front approaches the first end of the bed, additional first feed is charged to that first end and the hot wave front is then pushed back to the opposite end of the bed. With alternate charging of feeds at each end of the bed, the hot wave front is pushed back and forth through the bed with desorption in front of the hot wave and adsorption behind it. Additional hot fluid may be charged at any time prior to charging a feed at either end of the bed to replenish the hot wave front as desired. In a preferred embodiment, the hot fluid used to create the wave front is hot feed material of the same composition as that feed material charged to the bed at which the hot wave front is created or replenished.

The two feed materials used in the process of this invention are hydrocarbon feeds having different boiling ranges. For convenience, such feeds will hereinafter be differentiated as light hydrocarbon feeds and heavy hydrocarbon feeds. In the process, one light hydrocarbon feed and one heavy hydrocarbon feed may be employed, each being charged to an opposite end of the molecular sieve bed in reciprocating fashion as disclosed above. The terminology "light" and "heavy" are used merely to designate the difference in boiling range of the two feeds used in the process of this invention, and are not intended to be limiting as to the composition of a particular feed other than by comparison with the other feed used in the process.

An advantage of this invention is that it is necessary to use only a single bed for adsorption and desorption.

The FIGURE of the drawing is a schematic diagram of a flow illustrating the process of this invention.

With reference to the FIGURE and in accordance with one embodiment of this invention, as an example of a separation of hydrocarbons by molecular sieve using two feed streams, a first feed consisting of n-pentane and mixed isopentanes is charged at 300° F. through line 12, line 24, valve 23 and line 16 to tower 18. Valves 15 and 32 are maintained in closed position. Tower 18 contains Linde 5A molecular sieve pellets composed of molecular sieve material and a clay binder. The molecular sieve 19 is contained within tower 18 by screens 20 at each end of the bed. The screens are of very fine mesh sufficient to retain the pelleted molecular sieve in position within tower 18. Within the molecular sieve bed at each end are thermocouples 48 and 49. The function of the thermocouples will be more evident herein below. Chambers 22 and 25 are provided at each end of the molecular sieve bed within tower 18. The chambers may be packed with aluminum balls or other solid material, may be empty, or may be absent. The first feed charged through line 16 enters chamber 22 and passes through the molecular sieve material 19 of the bed. Normal pentane is adsorbed on the bed and mixed isopentanes are withdrawn from the bed through line 26, valve 27 and line 28. Valves 30 and 34 are maintained in closed position. After the adsorptive capacity or effective adsorptive capacity of the bed has been reached, e.g., as may be noted by breakthrough of normal pentane in line 26, valves 27 and 23 are closed and valves 34 and 32 are opened. A second feed consisting of n-hexane and mixed isohexanes is charged to line 29, through valve 34 and line 35 and through heater 36. In heater 36, the hexane feed is heated to a temperature of 600° F. and the heated fed is then charged through lines 35 and 26 to tower 18. Heated hexane is continuously charged to tower 18 until there is provided within tower 18 an amount sufficient to provide a heat front across the bed of sieve material 19 within tower 18. Valve 34 is then closed and valve 30 is opened. n-Hexane feed is charged at 300° F. through line 29, valve 30 and line 26 to tower 18. Charging of n-hexane feed is continued until the heat front (about 600° F.) is detected at the end of the bed adjacent to chamber 22. The heat front is detected by thermocouple 48 as a sudden and rapid rise in temperature. Other temperature-sensing means are known to the art and may conveniently be employed. Valves 30 and 32 are then closed and valves 23 and 27 are then opened and first feed, i.e. pentane feed, is again charged through line 12 as before. After three chargings of pentane feed through line 12, in this embodiment, it is desirable to replenish the hot wave front within the molecular sieve bed. Accordingly, the first portion of pentane feed of the first charging is diverted through heater 14 by closing valve 23 and opening valve 15 for a short period of time. The first portion of feed is heated to about 600° F. Valves 15 is then closed and valve 23 is then opened and charging of pentane feed at 300° F. is resumed.

Thermocouple 49 performs the same function as thermocouple 48 at the other end of the bed so that the heat front approaching each end of the bed is detected and may be reversed through the bed by charging fresh feed to that end of the bed where the heat front is detected.

During the operation of the above system, the materials removed through line 28 consist of mixed isopentane and normal hexane. These materials are charged to fractionator 44 and an overhead of isopentane is recovered through line 45 as a product while a bottoms fraction of normal hexane is recovered as a product through line 46. The material recovered from the other end of the bed in line 33 consists of normal pentane and mixed isohexanes. This material is charged to fractionator 40 where it is separated into an overhead of normal pentanes as a product from line 41 and a bottoms fraction of isohexane recovered through line 42 as a product.

As stated herein above, chambers 22 and 25 may be filled with aluminum balls or other solid material. This may be advantageous in that neither adsorption nor desorption occur in the zone of the molecular sieve occupied by the heat wave. The heat wave may be pushed out of each end of the molecular sieve bed on two aluminum balls or the like and thereby provide use of the entire length of the bed for adsorption and desorption. Enlarged chambers containing no aluminum balls or solids at each end of the bed as indicated by chambers 22 and 25 may also be used for this purpose although it is not believed that the heat front would be maintained in as definite a heat front in the absence of solid materials.

The feeds which may be employed in accordance herewith are those feeds normally used in molecular sieve separations for separation using adsorption followed by desorption by displacement. Advantageously, two feeds of differing boiling ranges, herein referred to as a heavy feed and a light feed are alternatingly charged to the sieve from opposite ends. At least one of the two feeds contains a mixture of straight-chain and nonstraight-chain hydrocarbons having differing adsorbabilities. The other feed also contains straight-chain hydrocarbons but may or may not contain nonstraight-chain hydrocarbons, i.e., the other feed may consist of straight-chain hydrocarbons either saturated, unsaturated or a mixture thereof. The light feed or heavy feed may correspond to either of these feeds. The straight-chain hydrocarbons are necessary in both feeds to achieve desorption by displacement. The straight-chain hydrocarbons are the normal paraffins and normal olefins including normal diolefins and the like. The nonstraight-chain hydrocarbons which the feeds might contain are isoparaffinic hydrocarbons, isoolefinic hydrocarbons, cycloparaffinic hydrocarbons, aromatic hydrocarbons, alkylated aromatic hydrocarbons and the like. The hydrocarbons of the feeds may contain from 1 to 30 or more carbon atoms and preferably contain from 2 to 12 carbon atoms. The feeds may advantageously be obtained from fractionating a mixture of hydrocarbons containing straight-chain hydrocarbons into a higher boiling fraction and a lower boiling fraction, each fraction containing straight-chain hydrocarbons. The higher boiling fraction and the lower boiling fraction may be used as the two alternating feeds to the molecular sieve bed in a single separation process. Examples of mixtures of hydrocarbons which may be fractionated to provide two feeds to this process are naphthas, reformer effluents, isomerization effluents, and other petroleum fractions. The process of this invention finds particular use in separating petroleum fractions by removal of straight-chain hydrocarbons therefrom.

Typical feeds which may be employed as either feed in this process are mixtures of butane and isobutane, n-pentane and isopentane, n-hexane and isohexane, n-octane and isooctane, n-dodecane and isododecane; mixtures of aromatic and normal paraffinic hydrocarbons boiling in the $C_5$–$C_6$ range, or mixtures of aromatic and normal paraffinic hydrocarbons boiling in the $C_7$–$C_{10}$ range, and the petroleum fractions described above.

Mixtures of saturated and unsaturated straight-chain hydrocarbons may also be used as both feeds and may be separated in accordance herewith. Examples of such mixtures are ethylene and ethane, propylene and propane, n-butylene and n-butane, n-hexane and n-hexene, n-decene and n-decane, n-dodecene and n-dodecane, n-eicosene and n-eicosane, n-butane and n-butadiene, n-pentene and n-pentadiene, etc. The normal hydrocarbons may be separated from each other especially where differences in saturation occur by "critical temperatures" by adsorption as are known to the art in separation with molecular sieve adsorbents.

Where it is desired to use one feed which does not contain non-straight-chain hydrocarbons, such other feed may be for example, ethylene, propane, n-butane, n-butylene, n-pentane, n-hexane, n-hexene, n-propane, n-octadecane, n-hexadecene, etc.

The molecular sieve adsorbents are those normally used for hydrocarbon separations. The molecular sieve adsorbent may be a synthetic zeolite or a natural zeolite or a mixture of both. The natural zeolites include those naturally occurring zeolitic materials having rigid 3-dimensional anionic networks such as chabazite, phacolite, gmelinite, harmotome, etc. The preferred molecular sieve materials are those synthetic molecular sieves such as Linde molecular sieve type 5A because of their uniform crystal structure and pore sizes. Such synthetic molecular sieves are available commercially having pore sizes from 4 A. up to about 13 A. such as those marketed by Linde Company, Division of Union Carbide Corp. The synthetic zeolites are synthetic crystalline partially dehydrated metallo-alumina silicates provided with uniform pores due to crystalline structure.

Such synthetic zeolites include the sodium-alumina silicates and calcium-alumina silicates. They may be prepared by heating stoichiometric quantities of alumina and silica in excess caustic under pressure. The excess caustic material is then washed out and a different metal ion may be introduced by ion exchange to form molecular sieves of different pore sizes. The Linde molecular sieves have pore sizes designated by the sieve nomenclature, e.g., molecular sieve 5A has a pore size of 5 A. while molecular sieve 4A has a pore size of 4 A. Molecular sieves useful in this invention are well known in the art.

As is evident from the above, the process in which the desorption method of this invention is utilized includes steps of adsorption and desorption. Adsorption of feed materials is carried out in the liquid phase or in the vapor phase and preferably in the vapor phase. Adsorption temperatures may advantageously be in the range of from about 0° F. to about 400° F. and preferably from about 250° F. to about 350° F. Desorption is at a temperature in the same range as the adsorption temperature and is preferably carried out at about the same temperature as adsorption. Therefore, the preferred operation of adsorption and desorption is isothermal except for the heat wave front preceding normal desorption temperature. The heat wave front may advantageously be at a temperature from about 200° F. to about 800° F. Advantageously, the temperature of the heat wave front may be at least about 100° F. or 200° F. above the adsorption temperature and is preferably about 300° F. above the adsorption temperature.

The products obtainable from this invention comprise substantially pure normal paraffins and normal olefins. Such products are recovered conveniently by fractionation of the desorbate from the molecular sieve bed during desorption. The two feeds boil in different ranges and the bed serves to transfer the straight-chain hydrocarbons from one feed into the other from which they may be separated by fractionation. The molecular sieve material is highly selective with regard to straight-chain hydrocarbons and high-purity products are obtainable.

It may be desirable to dry the hydrocarbon feeds and remove halides and other acidic materials which may attack or be strongly adsorbed on the molecular sieve material.

It is evident from the foregoing that I have provided a process for separating hydrocarbons by differences in adsorption characteristics using a molecular sieve adsorbent and employing a heat wave front through the bed preceding the desorption fluid during the desorption step.

I claim:

1. In a process for separating hydrocarbons by differences in adsorption characteristics wherein a hydrocarbon feed containing hydrocarbons of differing adsorbabilities is passed through a bed of molecular sieve adsorbent and the more readily adsorbable hydrocarbon is adsorbed on said adsorbent and wherein the adsorbed hydrocarbon is desorbed by displacement with another readily adsorbable hydrocarbon, said other readily adsorbable hydrocarbon boiling in a range differing from the boiling range of said feed, the combination with said process of the improvement which comprises passing a hot hydrocarbon fluid at least about 100° F. above the adsorption temperature through the bed immediately prior to desorption in an amount sufficient to create across said bed a hot temperature front at least about 100° F. above the adsorption temperature in said process and conducting the adsorption and desorption steps with cold feed and said other readily adsorbable hydrocarbon at temperatures at least about 100° F. below the temperature of said hot temperature front.

2. The process of claim 1 wherein said hot fluid is hot said other readily adsorbable hydrocarbon.

3. The process of claim 1 wherein the hydrocarbon feed is a mixture of saturated straight-chain and saturated branch-chain hydrocarbons.

4. The process of claim 1 wherein said hot fluid is at a temperature of from about 250 to about 350° F. hotter than said cold other readily adsorbable hydrocarbon.

5. The process of claim 10 wherein the temperature front is maintained by charging hot feed to said bed immediately prior to desorbing with relatively cold feed.

6. The process of claim 10 wherein the temperature front is at least about 100° F. hotter than the adsorption temperature in said bed.

7. The process of claim 10 wherein the two feeds which are alternatingly charged to said bed respectively comprise (1) a mixture of n-pentane and isopentanes and (2) n-butane.

8. The process of claim 1 wherein the hydrocarbon feed contains a mixture of straight-chain hydrocarbons and branch-chain hydrocarbons.

9. The process of claim 8 wherein said other adsorbable hydrocarbon is a straight-chain saturated hydrocarbon.

10. In a process for separating straight-chain hydrocarbons from fluid hydrocarbon feeds of differing boiling ranges wherein said fluid feeds are alternatingly charged to opposite ends of a bed of molecular sieve material at temperatures in the range of 0° F. to 400° F. and said molecular sieve material alternatingly adsorbs straight-chain hydrocarbons from said feeds and is alternatingly desorbed by displacement of adsorbed straight-chain hydrocarbons with straight-chain hydrocarbons with the other feed, the improvement which comprises maintaining across said bed a hot temperature front having a temperature at least 100° F. above adsorption temperature and moving said temperature front alternatingly to and from each end of said bed by the charging of relatively cold said feeds of differing boiling range alternatingly to opposite ends of said bed and on opposite sides of said temperature front, said relatively cold feeds being at temperatures at least about 100° F. lower than the temperature of said hot temperature front.

11. In a process for separating hydrocarbons by differences in adsorption characteristics wherein a first hydrocarbon feed containing straight-chain hydrocarbons and a second hydrocarbon feed containing straight-chain hydrocarbons boiling in a range differing from the boiling range of said first feed, are alternatingly adsorbed and desorbed by displacement by alternatingly charging said feeds through a bed of molecular sieve adsorbent at temperatures in the range of 0° F. to 400° F., each feed being charged at an opposite end of the said bed, the improvement which comprises maintaining across said bed a hot temperature front having a temperature in the range of 200° F. to 800° F. and at least about 200° F. above adsorption temperature and pushing said hot temperature front to and from each opposing end of the bed by alternatingly charging said first feed and said second feed through said bed from the opposing ends of said bed at temperatures of at least about 200° F. lower than the temperature of said hot temperature front.

12. A process for separating straight-chain hydrocarbons from a mixture of straight-chain hydrocarbons and nonstraight-chain hydrocarbons which process comprises fractionating said mixture into a light hydrocarbon fraction and a heavy hydrocarbon fraction, charging said light hydrocarbon fraction through a bed of molecular sieve material at a first end of said bed at a temperature of about 300° F. whereby straight-chain hydrocarbons are adsorbed, charging the heavy hydrocarbon fraction through said bed at a temperature of about 600° F. until sufficient heavy fraction had been charged to provide a temperature front of about 600° F. across said bed at the second end, subsequently charging the heavy fraction at a temperature of about 300° F. to said bed at said second end whereby said temperature front is pushed to said first end, thereafter charging light fraction to said first end of said bed whereby said temperature front is pushed to said second end of said bed, alternatingly charging said light and heavy fractions at said first and second ends of said bed respectively whereby said temperature front is pushed to and from each end of said bed, recovering a first intermediate product from said first end of said bed comprising straight-chain hydrocarbons from said light fraction and nonstraight-chain hydrocarbons from said heavy fraction, recovering a second intermediate product from said second end of said bed comprising straight-chain hydrocarbons from said heavy fraction and nonstraight-chain hydrocarbons from said light fraction, distilling said first intermediate product to obtain substantially pure light straight-chain hydrocarbons as an overhead product and heavy nonstraight-chain hydrocarbons as a bottoms product, and fractionating said second intermediate product to obtain light nonstraight-chain hydrocarbons as a second overhead product and heavy substantially pure straight-chain hydrocarbons as a second bottoms product.

13. The process of claim 12 wherein the hydrocarbon mixture is a mixture of normal and $C_5$–$C_6$ hydrocarbons, wherein the fractionation of said mixture produces a light fraction consisting of normal pentane and isopentane and a heavy fraction consists of normal hexanes and isohexanes and wherein normal pentane, isopentane, normal hexane and isohexane are each recovered as substantially pure final products from the process.

References Cited in the file of this patent
UNITED STATES PATENTS
2,935,467   Fleck et al. _____ May 3, 1960